United States Patent
Coates et al.

(10) Patent No.: US 6,694,389 B2
(45) Date of Patent: Feb. 17, 2004

(54) METHOD AND APPARATUS FOR DATA FLOW ANALYSIS

(75) Inventors: William S. Coates, Los Altos, CA (US); Mark R. Greenstreet, Vancouver (CA)

(73) Assignee: Sun Microsystems, Inc., Santa Clara, CA (US)

( * ) Notice: Subject to any disclaimer, the term of this patent is extended or adjusted under 35 U.S.C. 154(b) by 319 days.

(21) Appl. No.: 09/811,939

(22) Filed: Mar. 19, 2001

(65) Prior Publication Data

US 2002/0161945 A1 Oct. 31, 2002

(51) Int. Cl.⁷ ................................................. G06F 3/00
(52) U.S. Cl. ....................... 710/52; 710/57; 365/189.05; 370/229
(58) Field of Search ............................... 710/52–53, 57, 710/29; 365/189.05; 370/229

(56) References Cited

U.S. PATENT DOCUMENTS

| | | | | |
|---|---|---|---|---|
| 4,270,183 A | * | 5/1981 | Robinson et al. | 710/57 |
| 4,314,361 A | * | 2/1982 | Jansen et al. | 365/221 |
| 4,833,655 A | * | 5/1989 | Wolf et al. | 365/221 |
| 5,473,756 A | * | 12/1995 | Traylor | 710/57 |
| 5,809,521 A | * | 9/1998 | Steinmetz et al. | 711/116 |
| 6,047,339 A | * | 4/2000 | Su et al. | 710/56 |
| 6,058,439 A | * | 5/2000 | Devereux | 710/52 |
| 6,486,721 B2 | * | 11/2002 | Greenstreet et al. | 327/211 |

* cited by examiner

*Primary Examiner*—Kim Huynh
(74) *Attorney, Agent, or Firm*—Park, Vaughan & Fleming LLP

(57) ABSTRACT

The present invention provides a method and apparatus for data flow control. One embodiment detects input congestion and output starvation in a plurality of sub-buffers of a ripple FIFO buffer. This embodiment is used to draw conclusions about the occupancy of the ripple FIFO buffer under steady-state conditions. One embodiment detects input congestion and output starvation at every sub-buffer of the ripple FIFO buffer. Other embodiments detect input congestion and output starvation at a subset of the sub-buffers of the ripple FIFO buffer. One embodiment determines occupancy of the ripple FIFO buffer by the number of sub-buffers which report a steady congested state. Another embodiment determines occupancy of the ripple FIFO buffer by the number of sub-buffers which report a steady starved state. Another embodiment determines occupancy of the ripple FIFO buffer by the location of sub-buffers which report a steady congested state. Another embodiment determines occupancy of the ripple FIFO buffer by the location of sub-buffers which report a steady starved state. Other embodiments determine occupancy of the ripple FIFO buffer by a combination of the above methods.

39 Claims, 13 Drawing Sheets

METHOD AND APPARATUS FOR DATA FLOW ANALYSIS

BACKGROUND OF THE INVENTION

1. Field of the Invention

The present invention relates to the field of data transmission, and in particular to a method and apparatus for analyzing the flow of data through one or more buffers.

2. Background Art

In electronic systems, data items are transmitted between data producers and data receivers. A first-in-first-out (FIFO) buffer is commonly used between such producers and receivers. It is desirable to ensure that the FIFO buffer does not become full (congested) or empty (starved) during the transmission. Thus, the state of the FIFO is monitored, which enables the data producer and data receiver to modify their transfer rates to avoid filling or emptying the queue. Prior art monitoring schemes are undesirable for use with ripple FIFO buffers. A ripple FIFO buffer is comprised of a plurality of FIFO buffers connected in series. This problem can be better understood by a review of data transmission.

Data Transmission

When data is transmitted from a data producer to a data receiver, problems arise when the data producer's clock speed is different from the data receiver's clock speed. The clock speed regulates how fast the device can execute commands. If the data producer's clock speed is faster than the data receiver's clock speed, the data receiver may be unable to process the data as quickly as it is sent. Thus, some data items in the transmission may be lost.

Buffers

A buffer is a space in a computer's memory where data is temporarily stored. One use of a buffer is to prevent data loss due to differing clock speeds of separate computers attempting to exchange data. The data producer sends data items to the buffer. The buffer stores the data items until the data receiver is ready to receive more of the transmission. The buffer's clock speed is typically at least as fast as the clock speeds of both the data producer and the data receiver. Thus, no data is lost as a result of differing clock cycles.

Additionally, data transmissions typically occur in bursts. Without buffers, the data producer and data receiver must devote some or all of their resources to handling the data transmissions as they happen. As a result, the data producer and data receiver experience gaps of time where resources are available to handle data transmission, but no transmission exists. Additionally, the data producer and data receiver experience times where resources are not available to handle data transmission, but a transmission must occur. Buffers allow the data producer and the data receiver to schedule the transmission to take advantage of the times when resources are available.

FIG. 1 illustrates the operation of a buffer for a data transmission. At step 100, it is determined whether the data producer sent a data item. If the data producer sent a data item, at step 110, the item is stored in the buffer and the process moves on to step 120. If the data producer did not send a data item, the process moves directly to step 120. At step 120, it is determined whether the data receiver requested a data item. If the data receiver requested a data item, at step 130, the buffer sends a data item to the data receiver and the process repeats at step 100. If the data receiver did not request a data item, the process repeats at step 100.

FIFO Buffers

First-in-first-out (FIFO) buffers ensure the data items are received by the data receiver in the same order they are sent by the data producer. A FIFO buffer always sends the oldest data item in the buffer to the data receiver first.

FIG. 2 illustrates the operation of a FIFO buffer. At step 200, it is determined whether the data producer sent a data item. If the data producer sent a data item, at step 210, the item is stored in the FIFO buffer and the process moves on to step 220. If the data producer did not send a data item, the process moves directly to step 220. At step 220, it is determined whether the data receiver requested a data item. If the data receiver did not request a data item, the process repeats at step 200. If the data receiver requested a data item, at step 230, the FIFO buffer locates the oldest data item in the FIFO buffer. At step 240, the FIFO buffer sends the oldest data item to the data receiver and the process repeats at step 200.

Ring FIFO Buffers

Conventional FIFO buffers are typically implemented using a ring buffer. A ring buffer has an amount of storage space, a read pointer and a write pointer. A pointer is a location in a computer's memory that contains another memory location where data can be obtained or stored. As data items are added to the buffer, the write pointer is incremented to the next open position corresponding to the location in the computer's memory where the next data item in the buffer will be stored. Similarly, as data items are sent to the data receiver, the read pointer is incremented. Once a pointer reaches the end of the buffer, it repeats at the beginning of the buffer.

FIG. 3 illustrates a ring FIFO buffer. Data Items A(300), B(310) and C(320) are stored in the buffer in locations 1 (330), 2 (340) and 3 (350) respectively. The write pointer (360) points at location 4 (370). The read pointer (380) points at location 1. Locations 4 and 5 (390) are empty.

Ripple FIFO Buffers

A ripple FIFO buffer is comprised of a plurality of FIFO buffers connected in series. FIG. 4 illustrates a ripple FIFO buffer. The ripple FIFO buffer (400) is comprised sub-buffers 1 (410), 2 (420) and 3 (430). A data item (440) sent by the data producer (450) to the data receiver (460) would first pass through sub-buffer 1. Then, the data item would pass through sub-buffer 2. Next, the data item would pass through sub-buffer 3 before being sent to the data receiver.

If the data transfers between sub-buffers are not regulated by a clock, the buffer is termed an "asynchronous ripple FIFO buffer." Ripple FIFO sub-buffers implemented with asynchronous building blocks are very fast relative to clock cycles of typical data producers and data receivers. Thus, asynchronous ripple FIFO buffers can be embedded in clocked systems. The clock signal of the data producer or data receiver can be used to generate a request to the asynchronous ripple FIFO buffer.

To allow maximum flexibility to deal with bursts at the data sender or data receiver, it is desirable that the FIFO buffer be kept neither completely full nor completely empty. Half full may be a desirable state, where the is sufficient room to store a data sender burst and sufficient data stored to satisfy a data receiver burst. In one method, if the FIFO buffer is greater than half full, the FIFO buffer is becoming congested. If the FIFO buffer is less than half full, the FIFO buffer is becoming starved.

In another method, some point other than half full is the boundary between becoming congested and becoming starved in a FIFO buffer. In yet another method, a range of fullness is defined as the boundary. For example, a FIFO buffer may only be considered becoming starved when it is less than one third full while it is only considered becoming congested when it is greater than two thirds full. An important concern is to avoid overflow or underflow.

It is important to ensure there is space available at the input end of the asynchronous ripple FIFO buffer whenever the data producer wishes to insert a data item. The situation where no space is available when the data producer attempts to insert a data item is termed "overflow."

Additionally, it is important to ensure there is always a data item available at the output end of the asynchronous ripple FIFO buffer whenever the data receiver wishes to receive a data item. The situation where no data item is available when the data receiver attempts to remove a data item is termed "underflow."

Flow Control

In a conventional system, each end of a FIFO buffer operates in a different local clock domain. In some designs the two clocks are mesochronous. Mesochronous clocks have the same frequency but an unknown phase relationship. If the two clocks are mesochronous, the buffer should neither completely fill nor completely empty during data transmission.

In cases when the sender and receiver clocks are not mesochronous, or where communication is bursty, it is necessary to implement some sort of flow control to avoid completely filling or completely emptying the FIFO buffer. One prior art scheme for flow control is accomplished by monitoring the fullness, or relative occupancy, of the FIFO buffer and communicating this information to the data producer and data receiver to allow them to adjust their transfer rates.

FIG. 5 illustrates the operation of one embodiment of a flow controller. At step 500, it is determined whether the fullness of the buffer is above an upper threshold. If the fullness is not above an upper threshold, the process moves to step 530. If the fullness is above an upper threshold, at step 510, the buffer signals the data producer to decrease its transfer rate. At step 520, the buffer signals the data receiver to increase its transfer rate and the process moves to step 530. At step 530, it is determined whether the fullness of the buffer is below a lower threshold. If the fullness is not below a lower threshold, the process moves to step 500. If the fullness is below a lower threshold, at step 540, the buffer signals the data receiver to decrease its transfer rate. At step 550, the buffer signals the data producer to increase its transfer rate and the process moves to step 500.

Flow Control With Ripple FIFO Buffers

There are some disadvantages to using fullness to control flow with a ripple FIFO buffers. Individual ripple FIFO buffer sub-buffers rapidly alternate between full and empty states as data items move. The rapid alternation between full and empty states makes it difficult to estimate occupancy. Keeping a total of items in the buffer by monitoring the number of items inserted compared to the number of items removed is also difficult due to the decoupled nature of the interfaces with the data producer and the data receiver.

Additionally, fullness of the ripple FIFO buffer may not be the most useful measure for flow control. In the presence of congestion near the input of the ripple FIFO buffer, it is possible for input space to be unavailable even though the ripple FIFO buffer is nearly empty. Similarly, it is possible for the last sub-buffer to be empty even with the ripple FIFO buffer nearly full. If the ripple FIFO buffer is used to process the data in addition to buffering it, similar situations could arise due to data-dependent computation delays.

SUMMARY OF THE INVENTION

The present invention provides a method and apparatus for data flow control. One embodiment detects input congestion and output starvation in a plurality of sub-buffers of a ripple FIFO buffer. This embodiment is used to draw conclusions about the occupancy of the ripple FIFO buffer under steady-state conditions.

One embodiment detects input congestion and output starvation at every sub-buffer of the ripple FIFO buffer. Other embodiments detect input congestion and output starvation at a subset of the sub-buffers of the ripple FIFO buffer.

One embodiment determines occupancy of the ripple FIFO buffer by the number of sub-buffers which report a steady congested state. Another embodiment determines occupancy of the ripple FIFO buffer by the number of sub-buffers which report a steady starved state. Another embodiment determines occupancy of the ripple FIFO buffer by the location of sub-buffers which report a steady congested state. Another embodiment determines occupancy of the ripple FIFO buffer by the location of sub-buffers which report a steady starved state. Other embodiments determine occupancy of the ripple FIFO buffer by a combination of the above methods.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for monitoring data flow. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Detecting Congestion and Starvation

According to one embodiment of the present invention, at each boundary between sub-buffers of a ripple FIFO buffer, a NAND gate detects when the predecessor stage is full and the successor stage is empty. The operation of a NAND gate is shown in the truth table labeled as Table 1. In Table 1, columns 1 and 2 represent the inputs to the NAND gate and column 3 represents the output.

TABLE 1

| 1 | 2 | 3 |
|---|---|---|
| LO | LO | HI |
| LO | HI | HI |
| HI | LO | HI |
| HI | HI | LO |

One input to the NAND gate signals whether the predecessor sub-buffer is full. The other input to the NAND gate signals whether the successor sub-buffer is empty. This provides a convenient means to detect congestion and starvation at the sub-buffer, or local, level. Starvation or congestion is determined when both input signals to the NAND gate are HI by which input signal went HI first. If the predecessor sub-buffer fills before the successor sub-buffer empties, the ripple FIFO buffer is locally congested. If the successor sub-buffer empties before the predecessor sub-buffer fills, the ripple FIFO buffer is locally starved. If the predecessor sub-buffer fills at the same time the successor sub-buffer empties, the sub-buffers are said to be locally self-limited. Detecting which of the two signals arrives at the NAND function first determines whether the sub-buffers are locally starved or locally congested.

Figure 1:
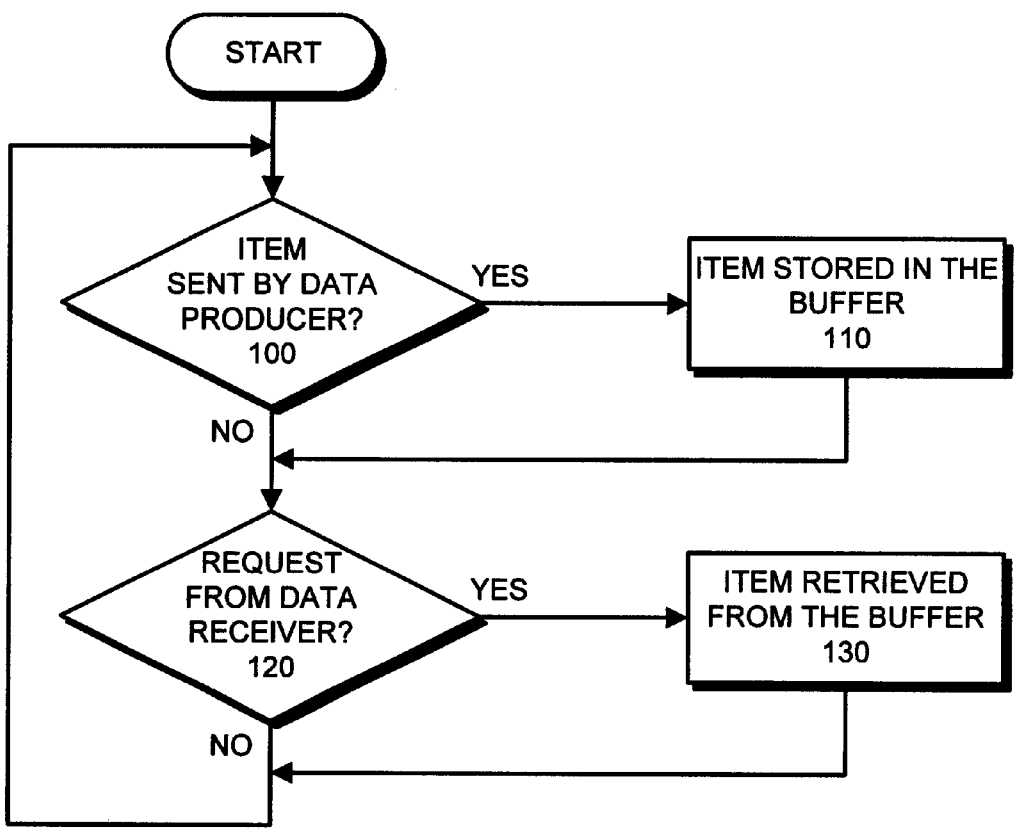
FIG. 1 is a flow diagram of buffer operation in data transmission.
Figure 2:
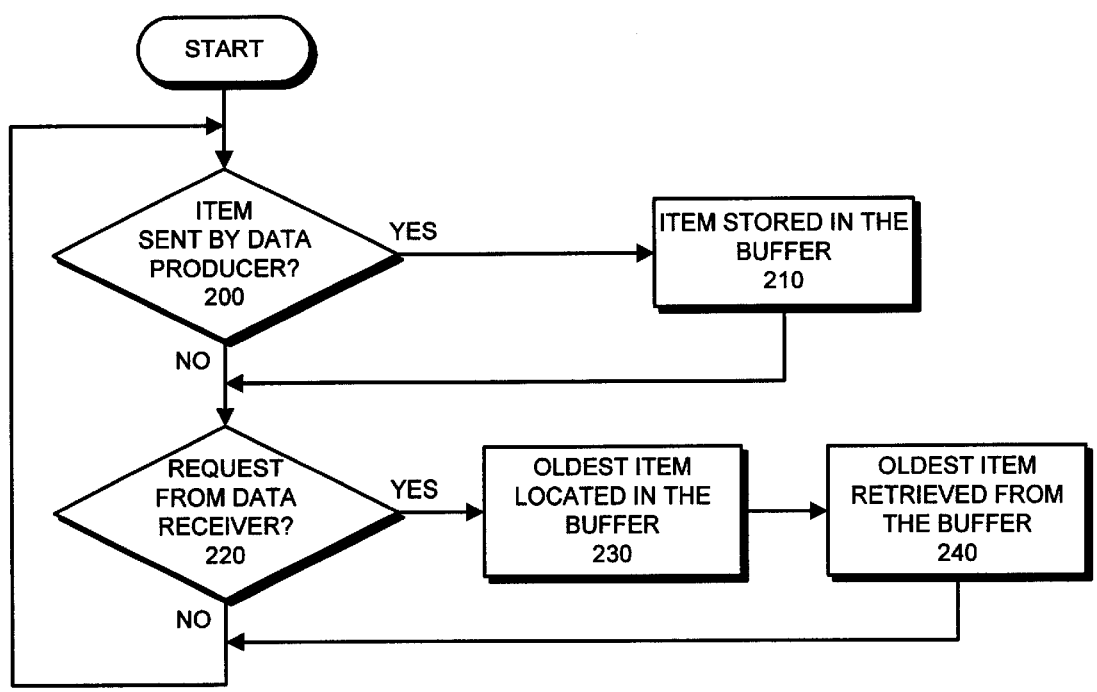
FIG. 2 is a flow diagram of first-in-first-out buffer operation in data transmission.
Figure 3:
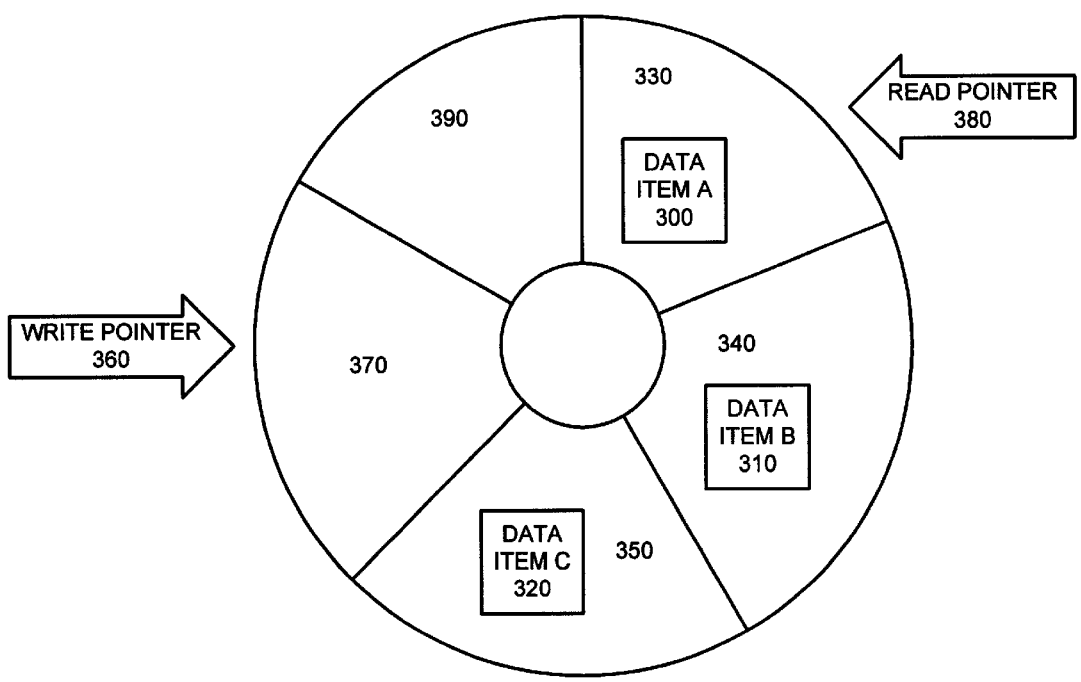
FIG. 3 is a block diagram of a ring first-in-first-out buffer.
Figure 4:
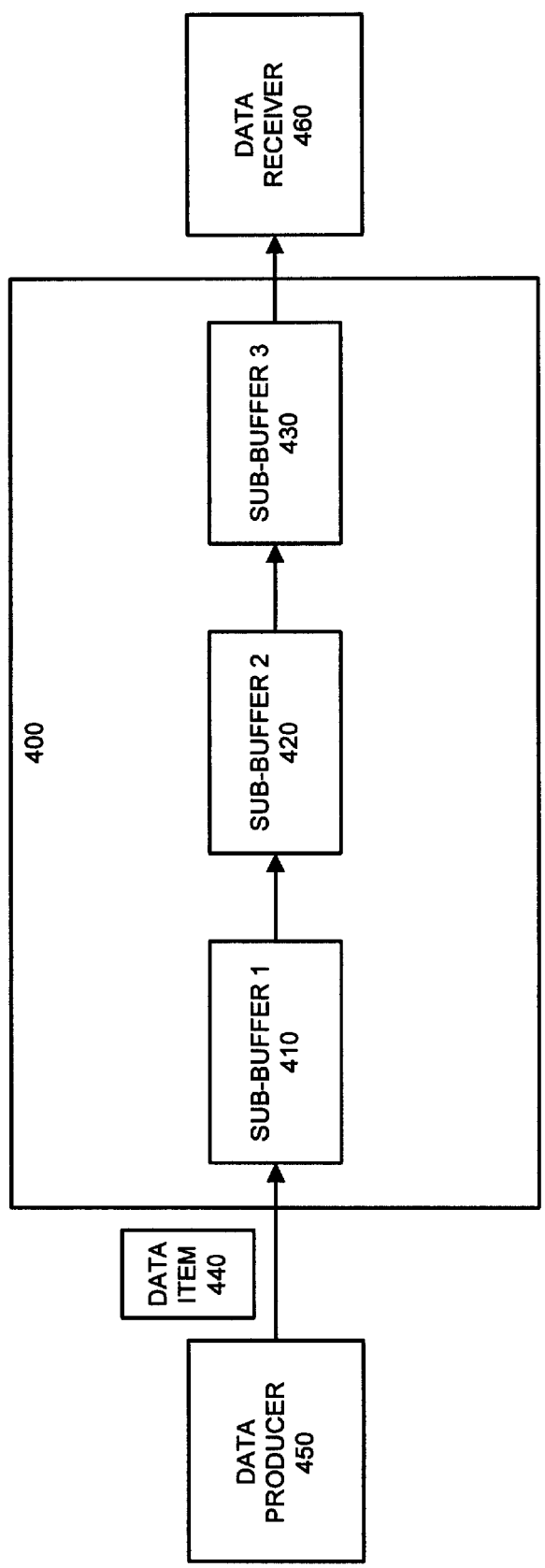
FIG. 4 is a block diagram of a ripple first-in-first-out buffer.
Figure 5:
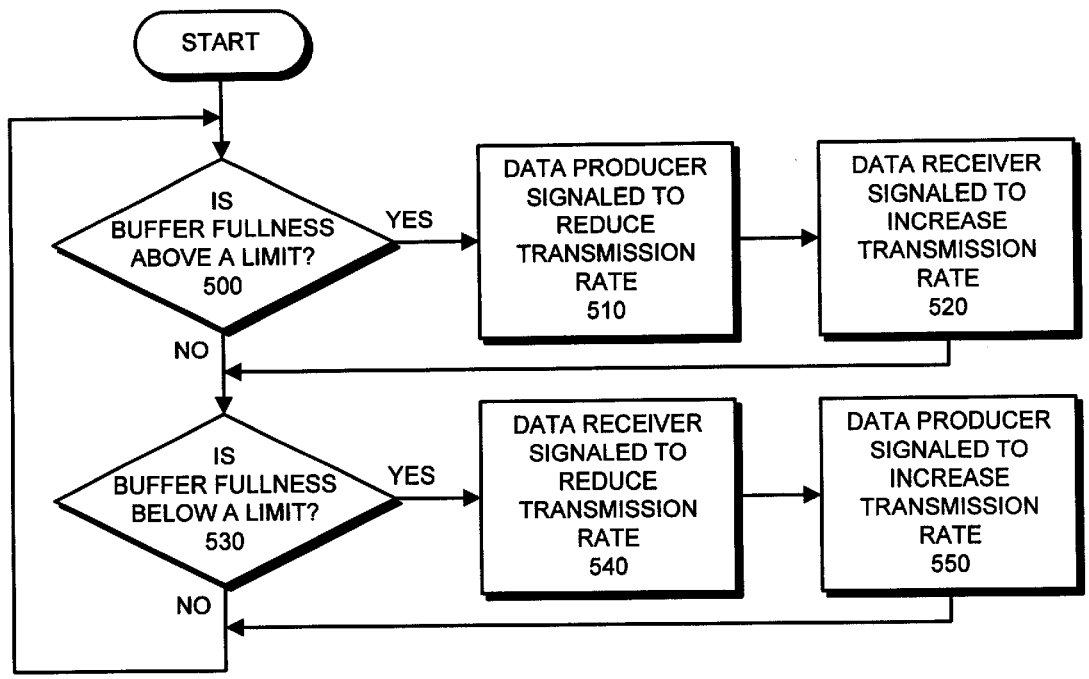
FIG. 5 is a flow diagram of the operation of a prior art flow controller.
Figure 6:
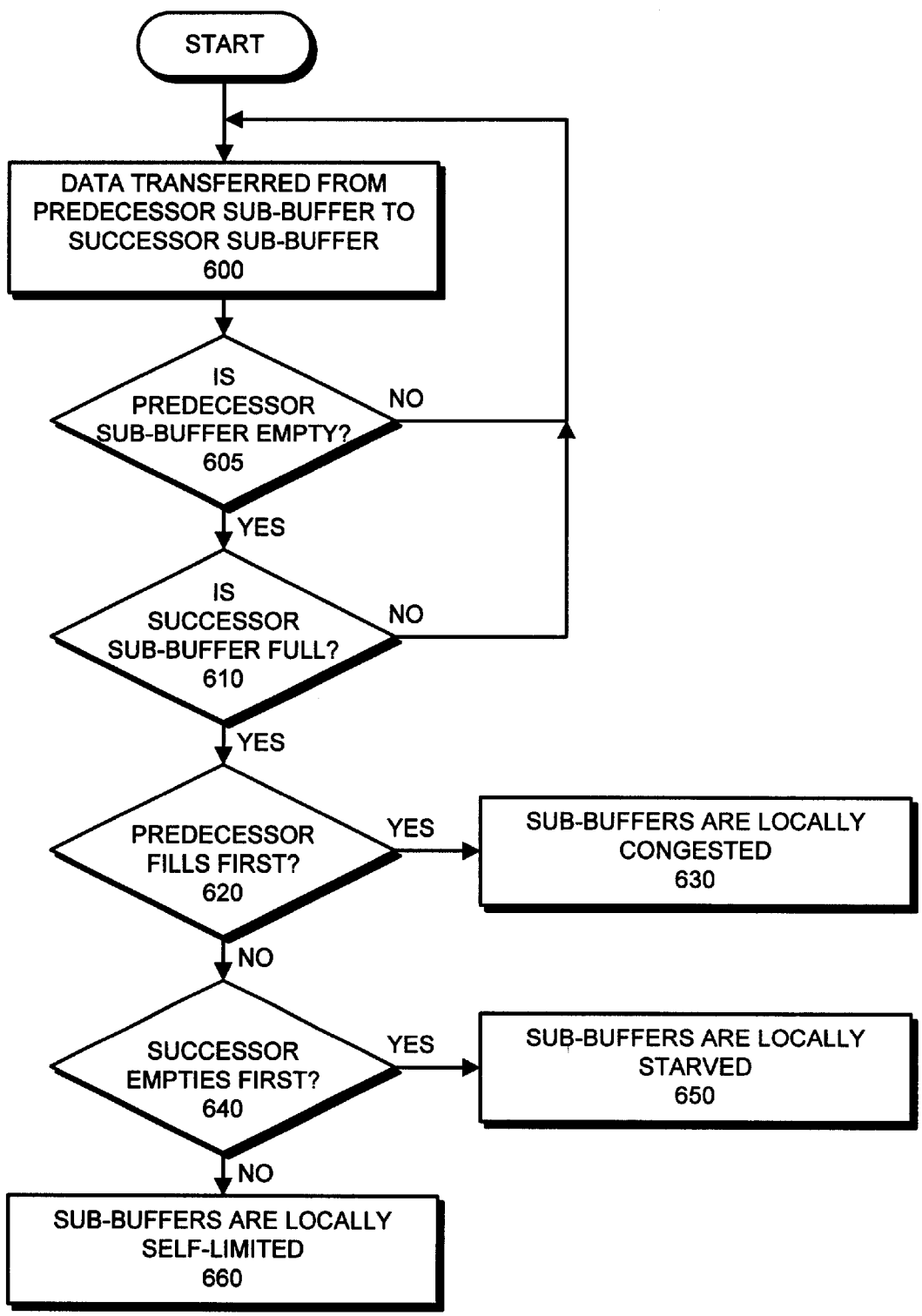
FIG. 6 is a flow diagram of the process used to determine whether there is local starvation or local congestion at a border between two sub-buffers of a ripple FIFO buffer in accordance with one embodiment of the present invention.

FIG. 6 illustrates the process used to determine whether there is local starvation or local congestion at a border between two sub-buffers of a ripple FIFO buffer in accordance with one embodiment of the present invention. At step 600, data is transferred from the predecessor sub-buffer to the successor sub-buffer. At step 605, it is determined whether the predecessor sub-buffer is empty. If the predecessor sub-buffer is not empty, the process repeats at step 600. If the predecessor sub-buffer is empty, at step 610, it is determined whether the successor sub-buffer is full. If the successor sub-buffer is not full, the process repeats at step 600.

If the successor sub-buffer is full, at step 620, it is determined whether the predecessor sub-buffer fills before the successor sub-buffer empties. If the predecessor sub-buffer fills before the successor sub-buffer empties, at step 630, the sub-buffers are locally congested. If the predecessor sub-buffer does not fill before the successor sub-buffer empties, at step 640, it is determined whether the successor sub-buffer empties before the predecessor sub-buffer fills. If the successor sub-buffer empties before the predecessor sub-buffer fills, at step 650, the sub-buffers are locally starved. If the successor sub-buffer does not empty before the predecessor sub-buffer fills, at step 660, the sub-buffers are locally self-limited.

Transition Region

In one embodiment of the present invention, the ripple FIFO buffer operates in a steady-state mode with the clock speed of the data producer equal to the clock speed of the data receiver. Additionally, the clock cycles of the data producer and data receiver are much longer than the cycle time of the sub-buffers of the ripple FIFO buffer. Thus, some number of stages at the input end of the ripple FIFO buffer are locally starved and some number near the output end of the ripple FIFO buffer are locally congested.

At some point along the ripple FIFO buffer, there is a region where the sub-buffers of the ripple FIFO buffer transition between locally starved and locally congested. The transition region may contain one or more locally self-limited sub-buffers. As the ripple FIFO buffer input or output rates vary over time, the location of the transition region will also vary. Since the input and output rates are significantly slower than the ripple FIFO buffer cycle time, it is unlikely that there will be more than one self-limited stage.

Monitor State Machine

Figure 7:
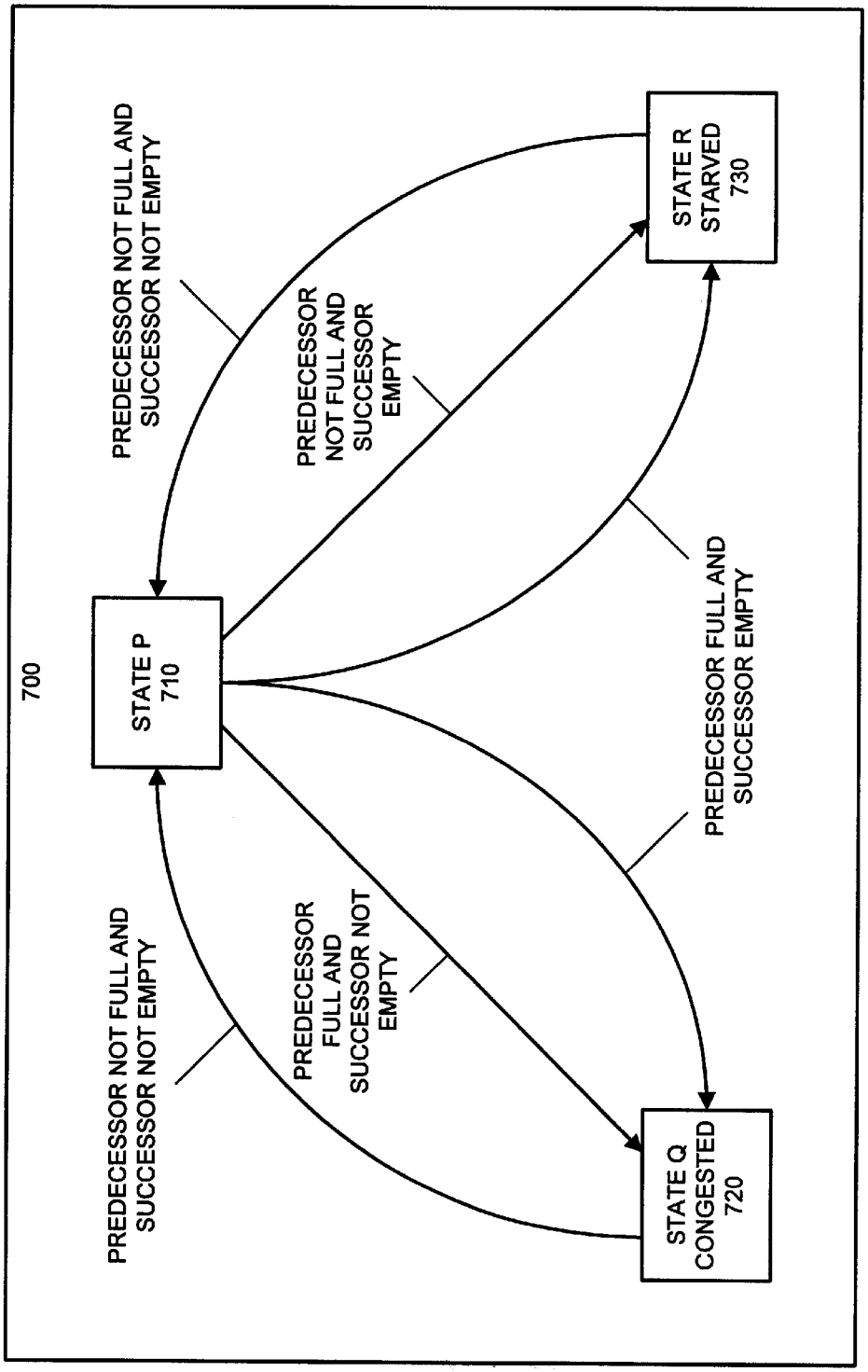
FIG. 7 is a block diagram of a monitoring state machine in accordance with one embodiment of the present invention.

FIG. 7 illustrates a state machine for detection of local starvation or congestion in accordance with one embodiment of the present invention. When the predecessor sub-buffer is not full and the successor sub-buffer is not empty, the state machine (700) is in state P (710). When the predecessor sub-buffer is full and the successor sub-buffer is not empty, the state machine moves to state Q (720) and the flow between sub-buffers is labeled locally congested. Similarly, when the successor the successor sub-buffer is empty and the predecessor sub-buffer is not full, the state machine moves to state R (730) and the flow between sub-buffers is labeled locally starved. However, when the predecessor sub-buffer is full and the successor sub-buffer is empty, the state machine moves, non-deterministically, to either state Q or state R.

Monitor Circuit Example

Figure 8:
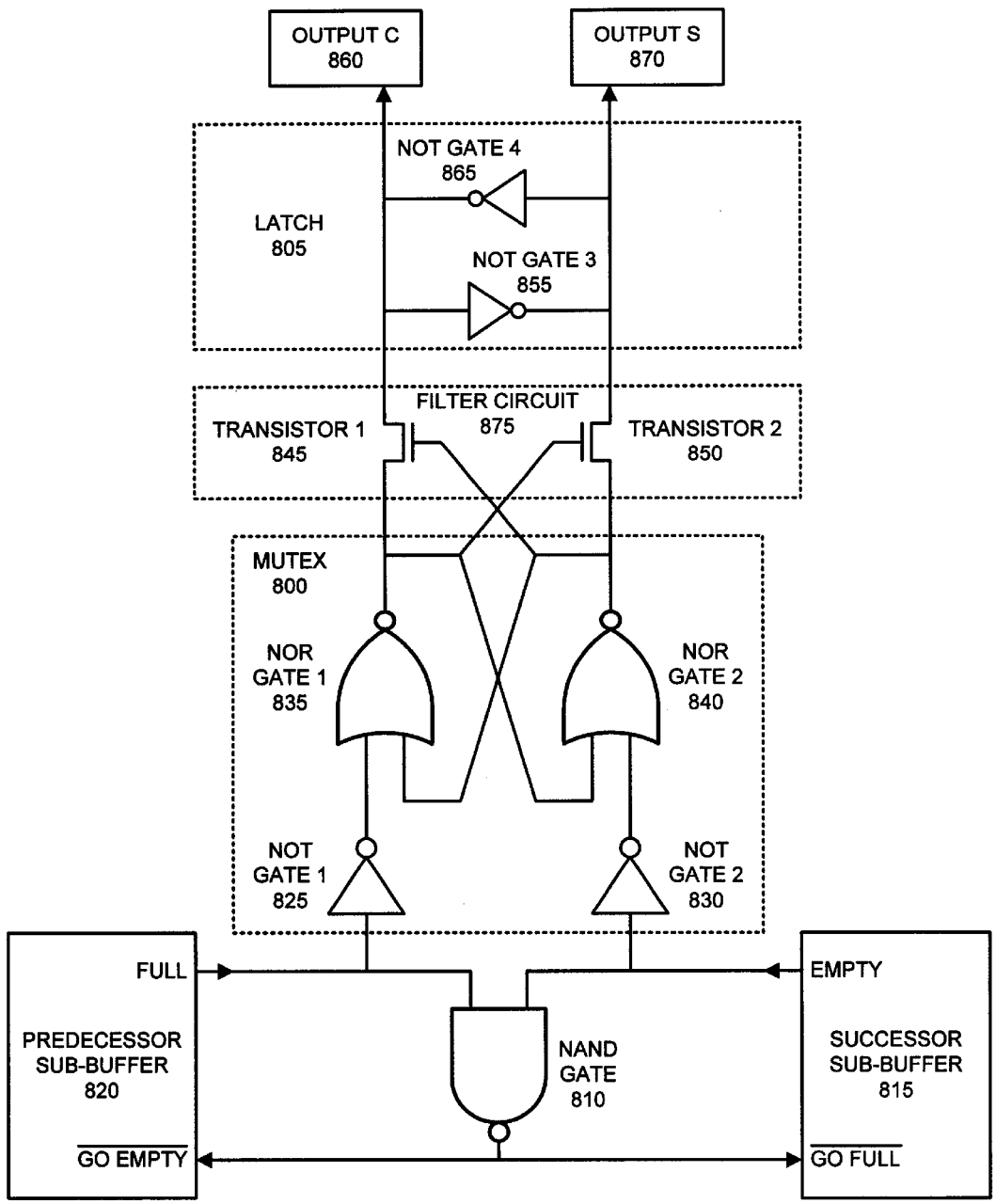
FIG. 8 is a block diagram of a monitoring circuit in accordance with one embodiment of the present invention.

FIG. 8 illustrates a circuit which detects which of the two NAND gate inputs arrive first in accordance with one embodiment of the present invention. The embodiment utilizes a mutual exclusion (MUTEX) element (800) followed by a filter circuit (875) followed by a latch (805). A NAND gate (810) receives a signal from the successor sub-buffer (815) that goes high to indicate that the sub-buffer is empty. The NAND gate also receives a signal from the predecessor sub-buffer (820) that goes high to indicate that the sub-buffer is full. The output of the NAND gate is coupled to the predecessor and successor sub-buffers. When the NAND gate output goes low, a data item is transferred from the predecessor to the successor, the predecessor is reset to the empty state and the successor is set to full.

The signal from the predecessor sub-buffer also couples to NOT gate 1 (825). The signal from the successor sub-buffer also couples to NOT gate 2 (830). The signal from NOT gate 1 couples to NOR gate 1 (835). The signal from NOT gate 2 couples to NOR gate 2 (840). The signal from NOR gate 1 couples to NOR gate 2, the signal input of transistor 1 (845) and the control input of transistor 2 (850). The signal from NOR gate 2 couples to NOR gate 1, the signal input of transistor 2 and the control input of transistor 1.

The signal from transistor 1 couples to NOT gate 3 (855). The signal from transistor 1 also couples to output C (860), which indicates whether the sub-buffer is congested. The signal from transistor 2 couples to NOT gate 4 (865). The signal from transistor 2 also couples to output S (870), which indicates whether the sub-buffer is starved. The signal from NOT gate 3 couples to NOT gate 4 and output S. The signal from NOT gate 4 couples to NOT gate 3 and output C.

Figure 9:
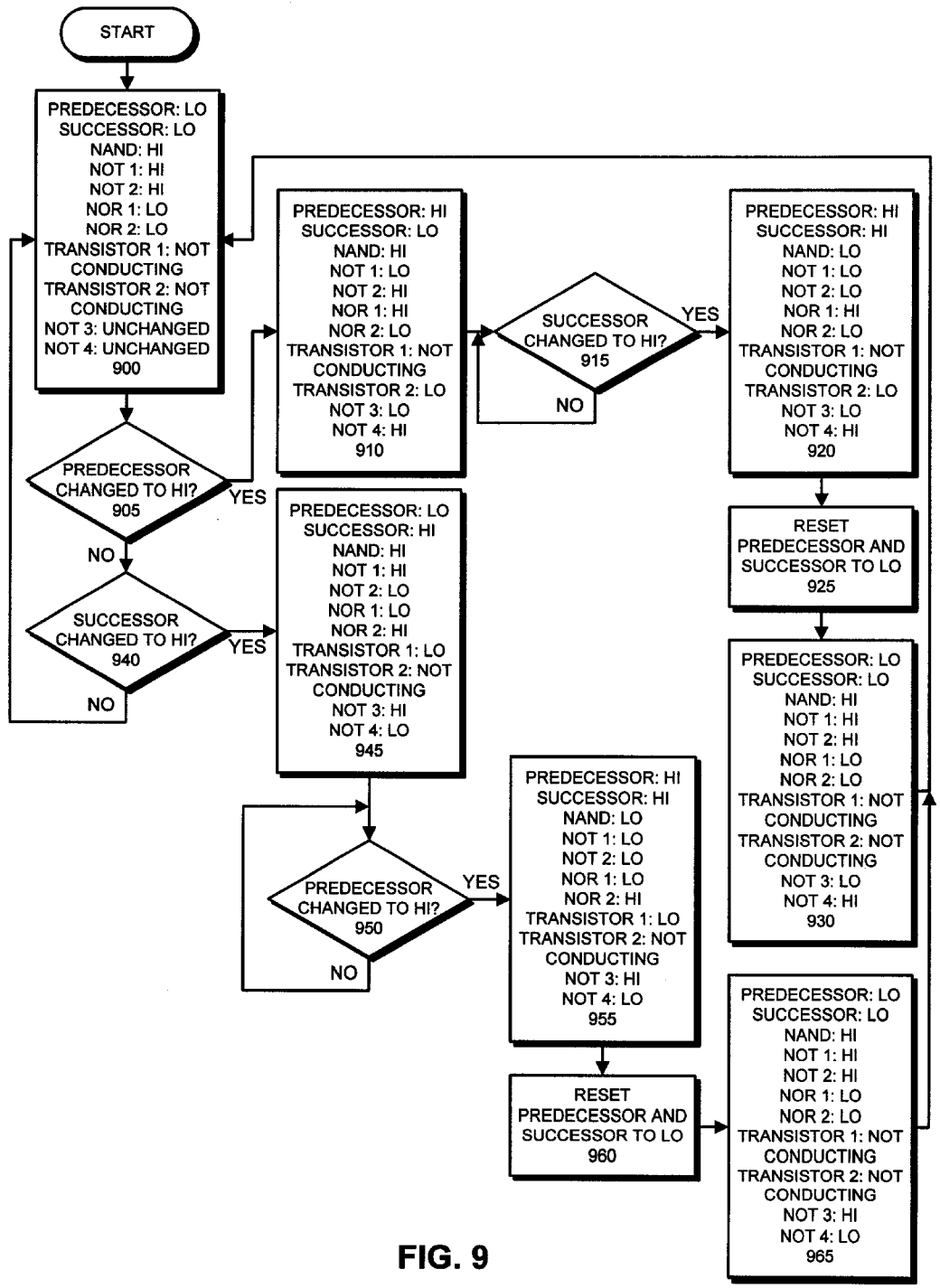
FIG. 9 is a flow diagram of the function of the embodiment of the present invention from FIG. 8.

FIG. 9 illustrates the operation of the embodiment of FIG. 8. At step 900, the signals from the predecessor sub-buffer, the successor sub-buffer, NOR gate 1 and NOR gate 2 are LO. The signal from the NAND gate, NOT gate 1 and NOT gate 2 are HI. The signals from NOT gate 3 and NOT gate 4 are unchanged. Transistor 1 and transistor 2 are not conducting. At step 905, it is determined whether the signal from the predecessor sub-buffer changes to HI. If the signal from the predecessor sub-buffer changes to HI, at step 910, the signals from NOT gate 1, NOR gate 2, transistor 2 and NOT gate 3 are LO. The signals from the NAND gate, NOT gate 2, NOR gate 1 and NOT gate 4 are HI. Transistor 1 is not conducting.

At step 915, it is determined whether the signal from the successor sub-buffer changes to HI. If the signal from the successor sub-buffer changes to HI, at step 920, the signals from the NAND gate, NOT gate 1, NOT gate 2, NOR gate 2, transistor 2 and NOT gate 3 are LO. The signals from NOR gate 1 and NOT gate 4 are HI. Transistor 1 is not conducting.

At step 925, the signals from the predecessor and successor sub-buffers are reset to LO. At step 930, the signals from NOR gate 1, NOR gate 2 and NOT gate 3 are LO. The signals from the NAND gate, NOT gate 1, NOT gate 2 and NOT gate 4 are HI. Transistor 1 and transistor 2 are not conducting. Thus, NOT gate 3 and NOT gate 4 maintain the correct signal to outputs C and S and the process repeats at step 900. If at step 915 the signal from the successor sub-buffer does not change to HI, the process repeats at step 915.

If at step 905 the signal from the predecessor sub-buffer does not change to HI, at step 940 it is determined whether the signal from the successor sub-buffer changes to HI. If the signal from the successor sub-buffer changes to HI, at step 945, the signals from NOT gate 2, NOR gate 1, transistor 1 and NOT gate 4 are LO. The signals from the NAND gate, NOT gate 1, NOR gate 2 and NOT gate 3 are HI. Transistor 2 is not conducting.

At step 950, it is determined whether the signal from the predecessor sub-buffer changes to HI. If the signal from the predecessor sub-buffer changes to HI, at step 955, the signals from the NAND gate, NOT gate 1, NOT gate 2, NOR gate 1, transistor 1 and NOT gate 4 are LO. The signals from NOR gate 2 and NOT gate 3 are HI. Transistor 2 is not conducting.

At step 960, the signals from the predecessor and successor sub-buffers are reset to LO. At step 965, the signals from NOR gate 1, NOR gate 2 and NOT gate 4 are LO. The signals from the NAND gate, NOT gate 1, NOT gate 2 and NOT gate 3 are HI. Transistor 1 and transistor 2 are not conducting. Thus, NOT gate 3 and NOT gate 4 maintain the correct signal to outputs C and S and the process repeats at step 900.

If at step 950 the signal from the predecessor sub-buffer does not change to HI, the process repeats at step 950. If at step 940 the signal from the successor sub-buffer does not change to HI, the process repeats at step 900.

In the embodiment of FIG. 7, the two inputs must reset LO within a gate delay of each other in order to ensure correct operation. If the later input to arrive happens also to reset late, a spurious grant pulse could flip the keeper to the incorrect state. The circuitry of the embodiment is tuned to ensure near-simultaneous reset to avoid incorrect states.

Additionally, if the two inputs to the embodiment are very close together, the MUTEX becomes metastable internally. The two n-type pulldown transistors are configured to shield this metastability from the keeper. However, if the MUTEX falls out of metastability, or "decides," just as its inputs are reset, the keeper becomes metastable. In practice, the metastability is acceptable. Metastability occurs only in the transition region of the ripple FIFO buffer. Additionally, in one embodiment of the present invention, the output signals are aligned to the data producer or data receiver clocks using standard synchronizer techniques to filter out any metastable voltages.

Alternative Monitor Circuits

Figure 10:
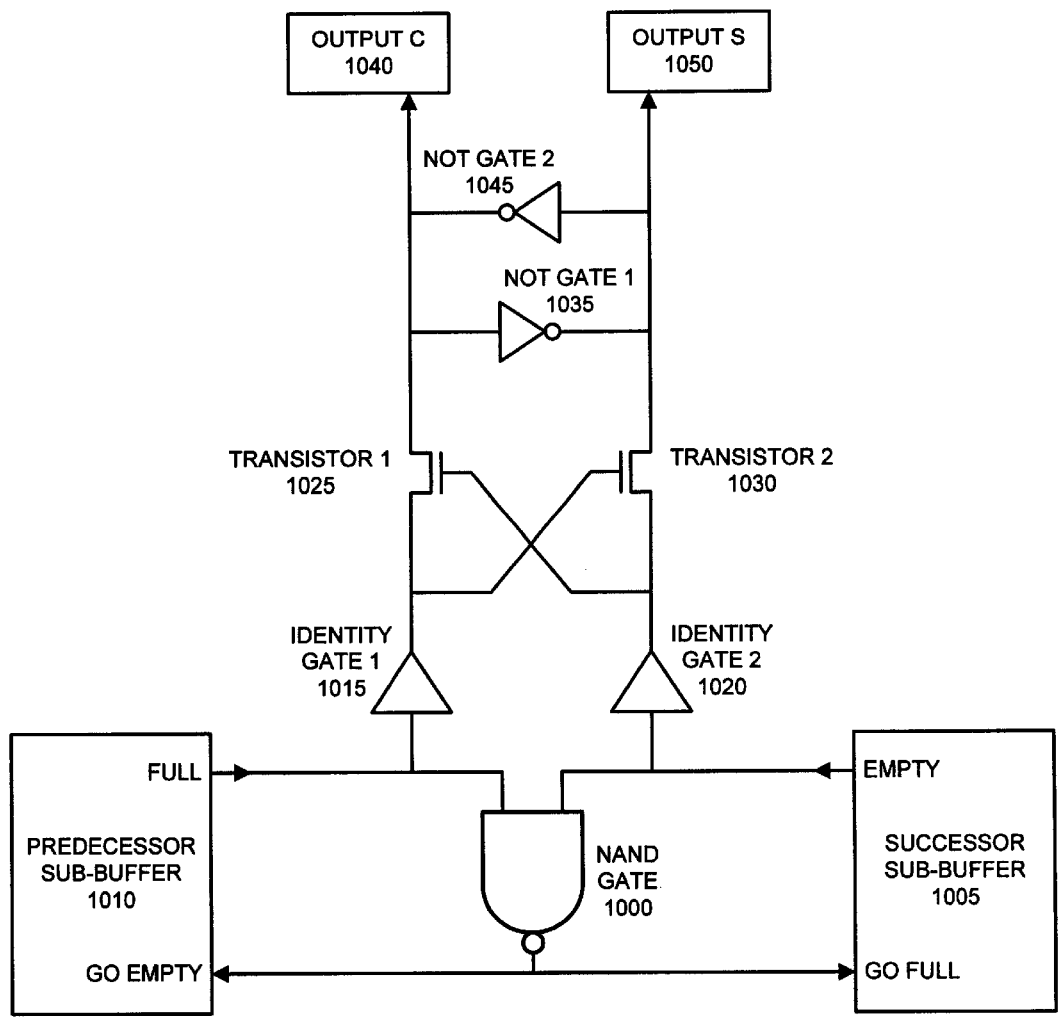
FIG. 10 is a block diagram of a monitoring circuit in accordance with one embodiment of the present invention.

FIG. 10 illustrates another embodiment of the present invention. A NAND gate (1000) receives a signal from the successor sub-buffer (1005) telling whether the sub-buffer is empty. The NAND gate also receives a signal from the predecessor sub-buffer (1010) telling whether the sub-buffer is full. The NAND gate sends its result to the predecessor and successor sub-buffers.

The signal from the predecessor sub-buffer also couples to IDENTITY gate 1 (1015). The signal from the successor sub-buffer also couples to IDENTITY gate 2 (1020). The signal from IDENTITY gate 1 couples to the signal input of transistor 1 (1025) and the control input of transistor 2 (1030). The signal from IDENTITY gate 2 couples to the signal input of transistor 2 and the control input of transistor 1. The signal from transistor 1 couples to NOT gate 1 (1035). The signal from transistor 1 also couples to output C (1040), which indicates whether the sub-buffer is congested. The signal from transistor 2 couples to NOT gate 2 (1045). The signal from transistor 2 also couples to output S (1050), which indicates whether the sub-buffer is starved. The signal from NOT gate 1 couples to NOT gate 2 and output S. The signal from NOT gate 2 couples to NOT gate 1 and output C.

Figure 11:
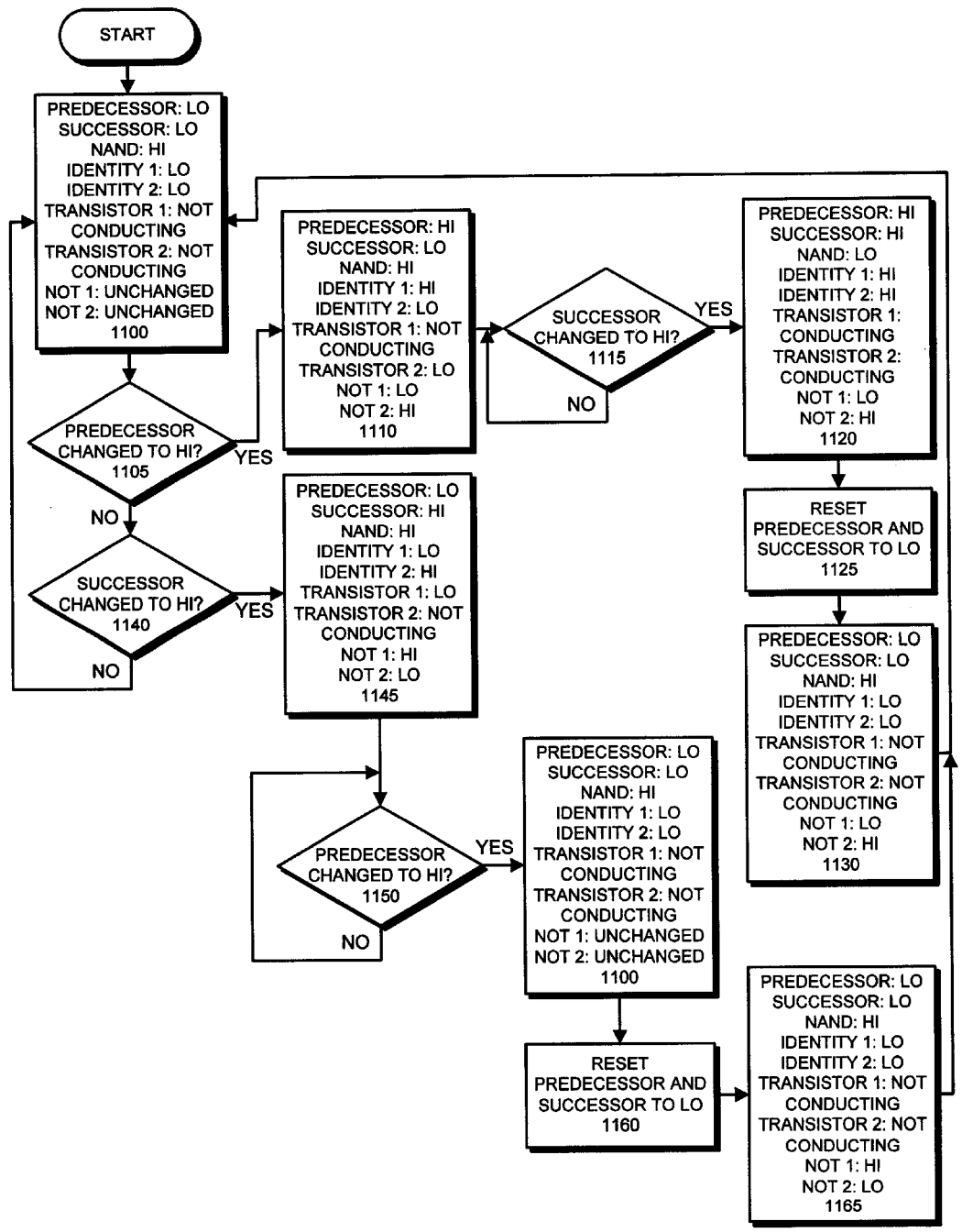
FIG. 11 is a flow diagram of the function of the embodiment of the present invention from FIG. 10.

FIG. 11 illustrates the operation of the embodiment of FIG. 10. At step 1100, the signals from the predecessor sub-buffer, the successor sub-buffer, IDENTITY gate 1 and IDENTITY gate 2 are LO. The signal from the NAND gate is HI. The signals from NOT gate 1 and NOT gate 2 are unchanged. Transistor 1 and transistor 2 are not conducting. At step 1105, it is determined whether the signal from the predecessor sub-buffer changes to HI. If the signal from the predecessor sub-buffer changes to HI, at step 1110, the signals from IDENTITY gate 2, transistor 2 and NOT gate 1 are LO. The signals from the NAND gate, IDENTITY gate 1 and NOT gate 2 are HI. Transistor 1 is not conducting.

At step 1115, it is determined whether the signal from the successor sub-buffer changes to HI. If the signal from the successor sub-buffer changes to HI, at step 1120, the signal from the NAND gate is LO. The signals from IDENTITY gate 1 and IDENTITY gate 2 are HI. Transistors 1 and 2 are conducting and sized such that the state of NOT gates 1 and 2 are maintained. Thus, the signal from NOT gate 1 remains LO, and the signal from NOT gate 2 remains HI.

At step 1125, the signals from the predecessor and successor sub-buffers are reset to LO. At step 1130, the signals from IDENTITY gate 1, IDENTITY gate 2 and NOT gate 1 are LO. The signals from the NAND gate and NOT gate 2 are HI. Transistor 1 and transistor 2 are not conducting. Thus, NOT gate 1 and NOT gate 2 maintain the correct signal to outputs C and S and the process repeats at step 1100. If at step 1115 the signal from the successor sub-buffer does not change to HI, the process repeats at step 1115.

If at step 1105 the signal from the predecessor sub-buffer does not change to HI, at step 1140 it is determined whether the signal from the successor sub-buffer changes to HI. If the signal from the successor sub-buffer changes to HI, at step 1145, the signals from IDENTITY gate 1, transistor 1 and NOT gate 2 are LO. The signals from the NAND gate, IDENTITY gate 2 and NOT gate 1 are HI. Transistor 2 is not conducting.

At step 1150, it is determined whether the signal from the predecessor sub-buffer changes to HI. If the signal from the predecessor sub-buffer changes to HI, at step 1155, the signal from the NAND gate is LO. The signals from IDENTITY gate 1 and IDENTITY gate 2 are HI. Transistors 1 and 2 are conducting and sized such that the state of NOT gates 1 and 2 are maintained. Thus, the signal from NOT gate 1 remains HI, and the signal from NOT gate 2 remains LO.

At step 1160, the signals from the predecessor and successor sub-buffers are reset to LO. At step 1165, the signals from IDENTITY gate 1, IDENTITY gate 2 and NOT gate 2 are LO. The signals from the NAND gate and NOT gate 1 are HI. Transistor 1 and transistor 2 are not conducting. Thus, NOT gate 1 and NOT gate 2 maintain the correct signal to outputs C and S and the process repeats at step 1100.

If at step 1150 the signal from the predecessor sub-buffer does not change to HI, the process repeats at step 1150. If at step 1140 the signal from the successor sub-buffer does not change to HI, the process repeats at step 1100.

Figure 12:
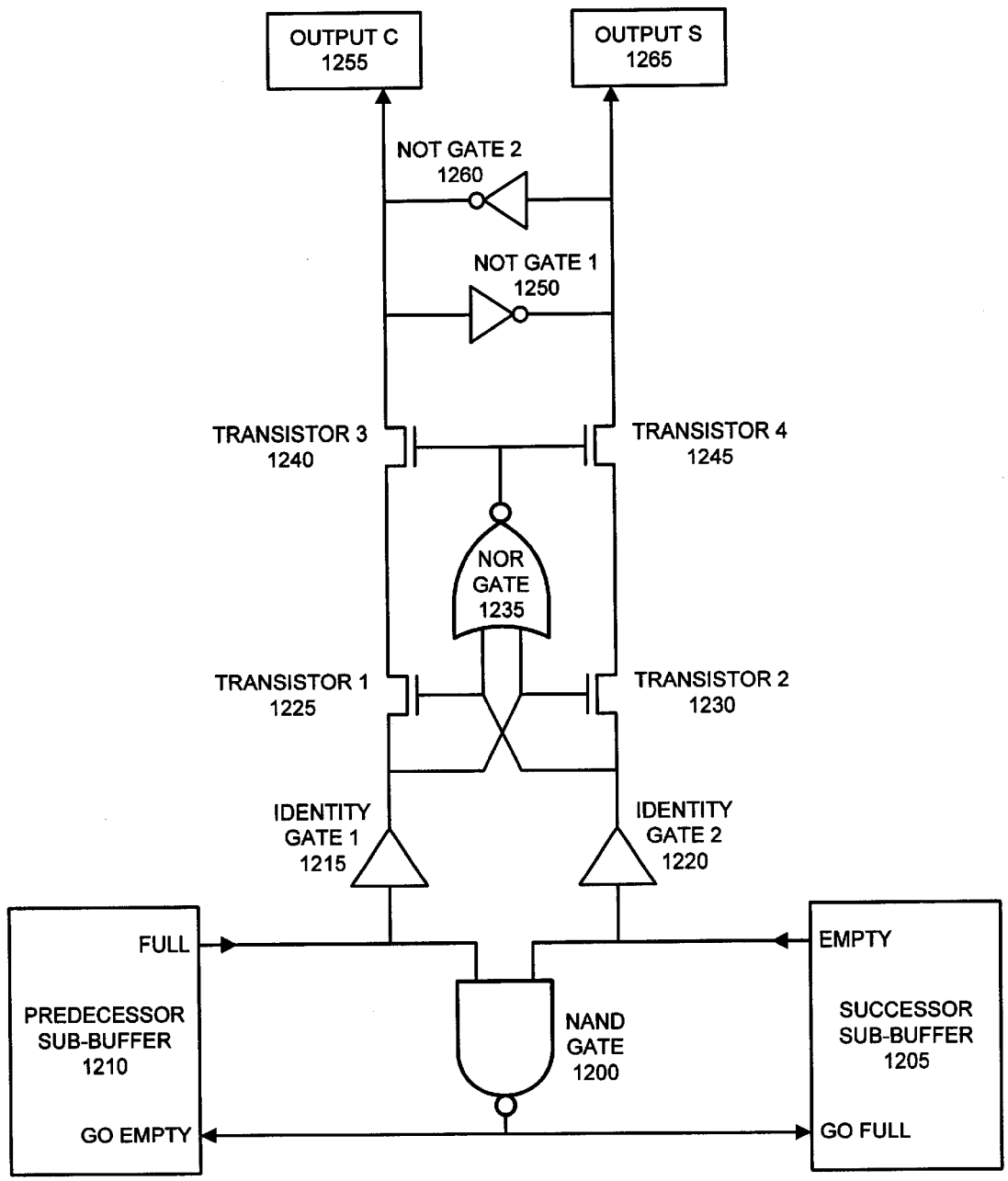
FIG. 12 is a block diagram of a monitoring circuit in accordance with one embodiment of the present invention.

FIG. 12 illustrates another embodiment of the present invention. A NAND gate (1200) receives a signal from the successor sub-buffer (1205) telling whether the sub-buffer is empty. The NAND gate also receives a signal from the predecessor sub-buffer (1210) telling whether the sub-buffer is full. The NAND gate sends its result to the predecessor and successor sub-buffers.

The signal from the predecessor sub-buffer also couples to IDENTITY gate 1 (1215). The signal from the successor sub-buffer also couples to IDENTITY gate 2 (1220). The signal from IDENTITY gate 1 couples to the signal input of transistor 1 (1225), the control input of transistor 2 (1230) and the NOR gate (1235). The signal from IDENTITY gate 2 couples to the signal input of transistor 2, the control input of transistor 1 and the NOR gate. The signal from transistor 1 couples to the signal input of transistor 3 (1240). The signal from transistor 2 couples to the signal input of transistor 4 (1245). The signal from the NOR gate couples to the control inputs of transistor 3 and transistor 4. The signal from transistor 3 couples to NOT gate 1 (1250). The signal from transistor 3 also couples to output C (1255), which indicates whether the sub-buffer is congested. The signal from transistor 4 couples to NOT gate 2 (1260). The signal from transistor 4 also couples to output S (1265), which indicates whether the sub-buffer is starved. The signal from NOT gate 1 couples to NOT gate 2 and output S. The signal from NOT gate 2 couples to NOT gate 1 and output C.

In this embodiment, both the pulling down of NOT gate 1 by transistor 1 and transistor 3 and the upward transition of the output of NOT gate 1 must be faster than the falling transition of the output of the NOR gate. Both paths are triggered by an upward transition on the output of IDENTITY gate 2. Likewise, both the pulling down of NOT gate 2 by transistor 2 and transistor 4 and the upward transition of the output of NOT gate 2 must be faster than the falling transition of the output of the NOR gate. Both paths are triggered by an upward transition on the output of IDENTITY gate 1.

Figure 13:
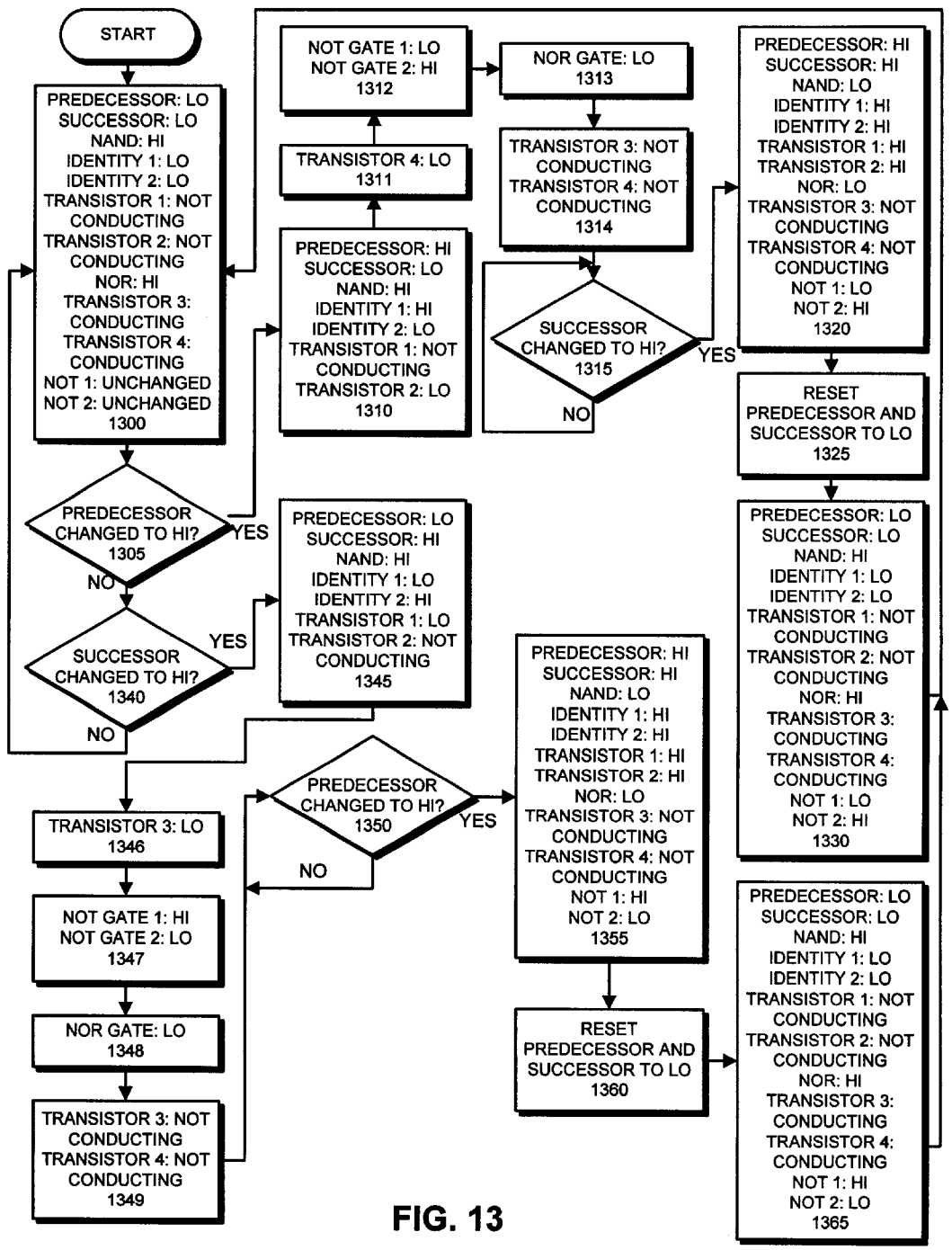
FIG. 13 is a flow diagram of the function of the embodiment of the present invention from FIG. 12.

FIG. 13 illustrates the operation of the embodiment of FIG. 12. At step 1300, the signals from the predecessor sub-buffer, the successor sub-buffer, IDENTITY gate 1 and IDENTITY gate 2 are LO. The signals from the NAND gate and the NOR gate are HI. The signals from NOT gate 1 and NOT gate 2 are unchanged. Transistor 1 and transistor 2 are not conducting. Transistor 3 is conducting, but it does not form a connection from the output of IDENTITY gate 1 to output node C because transistor 1 is not conducting. Likewise, transistor 4 is conducting, but it does not form a connection from the output of IDENTITY gate 2 to output node S because transistor 2 is not conducting.

At step 1305, it is determined whether the signal from the predecessor sub-buffer changes to HI. If the signal from the predecessor sub-buffer changes to HI, at step 1310, the signal from IDENTITY gate 2 is LO. The signals from the NAND gate and IDENTITY gate 1 are HI. Thus, transistor 2 conducts a signal of LO. At step 1311, the signal from transistor 4 is LO. Thus, at step 1312, the signal from NOT gate 1 is LO, and the signal from NOT gate 2 is HI. At step 1313, the signal from the NOR gate is LO. Thus, at step 1314, transistors 3 and 4 are not conducting.

At step 1315, it is determined whether the signal from the successor sub-buffer changes to HI. If the signal from the successor sub-buffer changes to HI, at step 1320, the signals from the NAND gate and the NOR gate are LO. The signals from IDENTITY gate 1, IDENTITY gate 2, transistor 1 and transistor 2 are HI. Transistors 3 and 4 are not conducting. Thus, the signal from NOT gate 1 remains LO, and the signal from NOT gate 2 remains HI.

At step 1325, the signals from the predecessor and successor sub-buffers are reset to LO. At step 1330, the signals from IDENTITY gate 1, IDENTITY gate 2 and NOT gate 1 are LO. The signals from the NAND gate, the NOR gate and NOT gate 2 are HI. Transistor 1 and transistor 2 are not conducting. Transistor 3 is conducting, but it does not form a connection from the output of IDENTITY gate 1 to output node C because transistor 1 is not conducting. Likewise, transistor 4 is conducting, but it does not form a connection from the output of IDENTITY gate 2 to output node S because transistor 2 is not conducting. Thus, NOT gate 1 and NOT gate 2 maintain the correct signal to outputs C and S and the process repeats at step 1300. If at step 1315 the signal from the successor sub-buffer does not change to HI, the process repeats at step 1315.

If at step 1305 the signal from the predecessor sub-buffer does not change to HI, at step 1340 it is determined whether the signal from the successor sub-buffer changes to HI. If the signal from the successor sub-buffer changes to HI, at step 1345, the signal from IDENTITY gate 1 is LO. The signals from the NAND gate and IDENTITY gate 2 are HI. Thus, transistor 1 conducts a signal of LO. At step 1346, the signal from transistor 3 is LO. Thus, at step 1347, the signal from NOT gate 2 is LO, and the signal from NOT gate 1 is HI. At step 1348, the signal from the NOR gate is LO. Thus, at step 1349, transistors 3 and 4 are not conducting.

At step 1350, it is determined whether the signal from the predecessor sub-buffer changes to HI. If the signal from the predecessor sub-buffer changes to HI, at step 1355, the signals from the NAND gate and the NOR gate are LO. The signals from IDENTITY gate 1, IDENTITY gate 2, transistor 1 and transistor 2 are HI. Transistor 3 and transistor 4 are not conducting. Thus, the signal from NOT gate 1 remains HI, and the signal from NOT gate 2 remains LO.

At step 1360, the signals from the predecessor and successor sub-buffers are reset to LO. At step 1365, the signals from IDENTITY gate 1, IDENTITY gate 2 and NOT gate 2 are LO. The signals from the NAND gate, the NOR gate and NOT gate 1 are HI. Transistor 1 and transistor 2 are not conducting. Transistor 3 is conducting, but it does not form a connection from the output of IDENTITY gate 1 to output node C because transistor 1 is not conducting. Likewise, transistor 4 is conducting, but it does not form a connection from the output of IDENTITY gate 2 to output node S because transistor 2 is not conducting. Thus, NOT gate 1 and NOT gate 2 maintain the correct signal to outputs C and S and the process repeats at step 1300.

If at step 1350 the signal from the predecessor sub-buffer does not change to HI, the process repeats at step 1350. If at step 1340 the signal from the successor sub-buffer does not change to HI, the process repeats at step 1300.

Utilizing Congestion and Starvation Data

When the ripple FIFO buffer reaches a steady state, all sub-buffers except for those close to the transition region will have stable outputs. Thus, static information is extracted from the highly dynamic control circuits. In one embodiment of the present invention, congestion or starvation data is gathered at every sub-buffer of the ripple FIFO buffer. In another embodiment of the present invention, starvation and congestion data from a subset of the sub-buffers of the ripple FIFO buffer allows generation of appropriate warning messages.

In one embodiment of the present invention, the approximate occupancy of the ripple FIFO buffer is calculated by counting the number of sub-buffers reporting a steady congestion state. In another embodiment of the present invention, the approximate occupancy of the ripple FIFO buffer is calculated by counting the number of sub-buffers reporting a steady starvation state. In another embodiment of the present invention, the approximate occupancy of the ripple FIFO buffer is calculated from the number of sub-buffers reporting a steady starvation state and the number of sub-buffers reporting a steady congestion state.

One embodiment of the present invention monitors complex networks of ripple FIFO buffers. One embodiment detects "hot spots" in complex networks of ripple FIFO buffers. Another embodiment gathers other traffic statistics in complex networks of ripple FIFO buffers. One embodiment of the present invention uses the starvation and congestion data to make global routing decisions.

One embodiment of the present invention operates without the keeper portion of the circuitry. The embodiment's starvation and congestion outputs drive an analog circuit. Another embodiment of the present invention uses the congestion and starvation output signals to charge and discharge a capacitor. In one embodiment of the present invention, the starvation and congestion outputs are wired together to deliver a summed current output. The analog voltage or current thus produced is fed back to control the input or output rates.

One embodiment of the present invention is based on the asP* protocol. It is apparent, however, to one skilled in the art, that the invention may be practiced with other ripple FIFO buffer designs.

Thus, a method and apparatus for data flow control is described in conjunction with one or more specific embodiments. The invention is defined by the following claims and their full scope an equivalents.

What is claimed is:

1. A method for analyzing a data flow compromising:
   partitioning a buffer into at least a first and second sub-buffer wherein a first data flow is between said first sub-buffer and said second sub-buffer;
   detecting when said first sub-buffer is full;
   detecting when said second sub-buffer is empty; and
   labeling said first data flow as congested if said first sub-buffer fills before said second sub-buffer empties, wherein said step of labeling is accomplished by a mutual exclusion element.

2. The method of claim 1 further comprising:
   labeling said first data flow as starved if said second sub-buffer empties before said first sub-buffer fills.

3. The method of claim 2 wherein said step of labeling said first data flow as starved is accomplished by said mutual exclusion element.

4. The method of claim 2 wherein said step of labeling said first data flow as congested and said step of labeling said first data flow as starved are performed at a rate of a labeling per data transfer.

5. The method of claim 2 further comprising:
   storing a label wherein said label is how said first data flow is labeled.

6. The method of claim 5 further comprising:
   adjusting said first data flow between said first and second sub-buffers.

7. The method of claim 6 wherein said step of adjusting further comprises:
   increasing said first data flow from said first sub-buffer to said second sub-buffer when said first data flow is labeled as congested.

8. The method of claim 6 wherein said step of adjusting further comprises:
   decreasing said first data flow from said first sub-buffer to said second sub-buffer when said first data flow is labeled as starved.

9. The method of claim 5 wherein said first sub-buffer and said second sub-buffer are part of a ripple FIFO.

10. The method of claim 9 further comprising:
    calculating a value using at lease said label; and
    determining a second label for said data flow wherein said second label is determined from said value.

11. The method of claim 10 wherein said step of calculating comprises:
    determining a number of locally starved data flows.

12. The method of claim 10 wherein said step of calculating comprises:
    determining a number of locally congested data flows.

13. The method of claim 10 wherein said step of calculating comprises:
    calculating an analog aggregate value from a set of localized data flows.

14. A data flow analyzer comprising:
    a buffer partitioned into at least a first and second sub-buffer wherein a first data flow is between said first sub-buffer and said second sub-buffer;
    a second data flow wherein said second data flow is across said buffer;
    a first detector configured to determine when said first sub-buffer is full;
    a second detector configured to determine when said second sub-buffer is empty; and
    a labeler configured to label a first data flow as congested if said first sub-buffer fills before said second sub-buffer empties, wherein said labeler comprises a mutual exclusion element.

15. The data flow analyzer of claim 14 wherein said labeler is further configured to label said first data flow as starved if said second sub-buffer empties before said first sub-buffer fills.

16. The data flow analyzer of claim 15 wherein said labeler comprises:
    a mutual exclusion element.

17. The data flow analyzer of claim 15 wherein said labeler is further configured to label said first data flow rate at a rate of a labeling per data transfer.

18. The data flow analyzer of claim 15 further comprising:
a storage device configured to store a label wherein said label is how said data flow is labeled.

19. The data flow analyzer of claim 18 further comprising:
an adjuster configured to adjust said data flow between said first and second sub-buffers.

20. The data flow analyzer of claim 19 wherein said adjuster is further configured to increase said flow rate from said first sub-bugger to said second sub-buffer when said data flow is labeled as congested.

21. The data flow analyzer of claim 19 wherein said adjuster is further configured to decrease said flow rate from said first sub-buffer to said second sub-buffer when said data flow is labeled as starved.

22. The data flow analyzer of claim 18 wherein said first sub-buffer and said second sub-buffer are part of a ripple FIFO.

23. The data flow analyzer of claim 22 further comprising:
a calculation unit configured to calculate a value using at least said label; and
a determiner configured to determine a second label for said second data flow wherein said second label is determined from said value.

24. The data flow analyzer of claim 23 wherein said calculation unit comprises:
a second determiner configured to determine a number of locally starved data flows.

25. The date flow analyzer of claim 23 wherein said calculation unit comprises:
a second determiner configured to determine a number of locally congested data flows.

26. The data flow analyzer of claim 23 wherein said calculation unit comprises: a second calculation unit configured to calculate an analog aggregate value from a set of localized data flows.

27. A computer program product comprising:
a computer usable medium having computer readable program code embodied therein configured for analyzing a data flow, comprising:
computer readable code configured to cause a computer to partition a buffer into at least a first and second sub-buffer wherein a first data flow is between said first sub-buffer and said second sub-buffer;
computer readable code configured to cause a computer to detect when said first sub-buffer is full;
computer readable code configured to cause a computer to detect when said second sub-buffer is empty; and
computer readable code configured to cause a computer to label said first data flow as congested if said first sub-buffer fills before said second sub-buffer empties, wherein said computer readable code configured to cause a computer to label comprises computer readable code configured to cause a computer to emulate a mutual exclusion unit.

28. The computer program product of claim 27 wherein said computer readable code configured to cause a computer to label further comprises:
computer readable code configured to cause a computer to label said first data flow as starved if said second sub-buffer empties before said first sub-buffer fills.

29. The computer program product of claim 28 wherein said computer readable code configured to cause a computer to label said first data flow as starved comprises:
computer readable code configured to cause a computer to emulate a mutual exclusion unit.

30. The computer program product of claim 28 wherein said computer readable code configured to cause a computer to label said first data flow as congested and said computer readable code configured to cause a computer to label said first data flow as starved are further configured to label said first data flow rate at a rate of a labeling per data transfer.

31. The computer program product of claim 28 wherein said computer readable code configured to cause a computer to analyze further comprises:
computer readable code configured to cause a computer to store a label wherein said label is how said first data flow is labeled.

32. The computer program product of claim 31 wherein said computer readable code configured to cause a computer to analyze further comprises:
computer readable code configured to cause a computer to adjust said first data flow between said first and second sub-buffers.

33. The computer program product of claim 32 wherein said computer readable code configured to cause a computer to adjust further comprises:
computer readable code configured to cause a computer to increase said first data flow from said first sub-buffer to said second sub-buffer when said first data flow is labeled as congested.

34. The computer program product of claim 32 wherein said computer readable code configured to cause a computer to adjust further comprises:
computer readable code configured to cause a computer to decrease said first data flow from said first sub-buffer to said second sub-buffer when said first data flow is labeled as starved.

35. The computer program product of claim 31 wherein said first sub-buffer and said second sub-buffer are part of a ripple FIFO.

36. The computer program product of claim 35 further comprising:
computer readable code configured to cause a computer to calculate a value using at least said label; and
computer readable code configured to cause a computer to determine a second label for said second data flow wherein said second label is determined from said value.

37. The computer program product of claim 36 wherein said computer readable code configured to cause a computer to calculate comprises:
computer readable code configured to cause a computer to determine a number of locally starved data flows.

38. The computer program product of claim 36 wherein said computer readable code configured to cause a computer to calculate comprises:
computer readable code configured to cause a computer to determine a number of locally congested data flows.

39. The computer program product of claim 36 wherein said computer readable code configured to cause a computer to calculate comprises:
computer readable code configured to cause a computer to emulate the calculation of an analog aggregate value from a set of localized data flows.

* * * * *